United States Patent [19]

Reimann et al.

[11] Patent Number: 4,567,411

[45] Date of Patent: Jan. 28, 1986

[54] HIGH FREQUENCY PULSE WIDTH MODULATION

[75] Inventors: Kurt Reimann; Bernd Ackermann; Rüediger Löeb, all of Berlin; Claus Ruther, Munich, all of Fed. Rep. of Germany

[73] Assignee: Otis Elevator Company, Farmington, Conn.

[21] Appl. No.: 715,130

[22] Filed: Mar. 22, 1985

[51] Int. Cl.⁴ .............................. H02P 3/00; B66B 1/30
[52] U.S. Cl. ..................................... 318/341; 318/466; 318/266; 187/29 R
[58] Field of Search ............... 187/29, 29 R; 318/341, 318/302, 308, 309, 311, 314, 318, 327, 329, 245, 257, 258, 266, 617, 283, 618, 599, 594, 600, 601, 603, 606, 807, 809, 810, 811; 364/183

[56] References Cited

U.S. PATENT DOCUMENTS

| | | | |
|---|---|---|---|
| 4,006,392 | 2/1977 | Catlett et al. | 318/283 X |
| 4,054,820 | 10/1977 | Foster | 318/341 |
| 4,128,142 | 12/1978 | Satoh et al. | 187/29 R |
| 4,155,426 | 5/1979 | Booker, Jr. | 187/29 R |
| 4,337,429 | 6/1982 | Stuart | 318/811 |
| 4,337,929 | 8/1983 | Odaka et al. | 318/266 X |
| 4,427,933 | 1/1984 | Wagener et al. | 318/809 X |
| 4,429,264 | 1/1984 | Richmond | 318/266 X |
| 4,449,078 | 5/1984 | Ogishi et al. | 318/603 X |
| 4,471,281 | 9/1984 | Uezumi et al. | 318/606 |
| 4,472,671 | 9/1984 | Shapiro | 318/809 X |
| 4,489,267 | 12/1984 | Saar et al. | 318/811 |

*Primary Examiner*—William M. Shoop, Jr.
*Assistant Examiner*—Shik L. P. Ip
*Attorney, Agent, or Firm*—Gerald E. Linde

[57] ABSTRACT

A counter (24) increments several times during the duty cycle of a microprocessor (10), and a comparator (30) connected to both outputs a High signal when the microprocessor output exceeds the counter output and outputs a Low signal when the counter output is at least the microprocessor output. The microprocessor output is proportional to desired motor speed for an elevator door drive motor according to a velocity profile stored in a ROM (18). Thereby, the High:Low ratio of the comparator output is a pulse width modulation signal, which is amplified (34) for the motor (12), at a much higher frequency than the microprocessor duty cycle.

1 Claim, 2 Drawing Figures

HIGH FREQUENCY PULSE WIDTH MODULATION

TECHNICAL FIELD OF THE INVENTION

The invention relates to pulse width modulation techniques for effecting DC motor speed control.

BACKGROUND OF THE INVENTION

In a microprocessor-based control, cost considerations often mandate the use of lower speed processors. A DC motor can be controlled by such a processor by providing the processor output to a pulse width modulation circuit that operates on the same duty cycle as the microprocessor, such as 100 Hz, wherein the mark:space ratio is proportional to the processor output. Given the mechanical time constant of a typical DC motor, 100 Hz, pulse width modulation is entirely adequate. With such a system there would be an attendant "hum" produced by the harmonics of the pulse width modulator. While in many applications the hum would not be objectionable, in the context of a motor speed control located atop an elevator cab, such as for a door opening/closing mechanism, the hum would be discernable, and actually objectionable, especially when the acoustical properties of an elevator cab are considered.

DISCLOSURE OF THE INVENTION

Therefore, it is an object of invention to provide a technique for controlling the motor speed of a DC door motor located atop an elevator cab at frequencies substantially higher than the microprocessor control duty cycle.

According to the invention, a counter increments several times during the duty cycle of a microprocessor, and a comparator connected to both outputs a high signal when the microprocessor output exceeds the counter output and outputs a Low signal when the counter output is at least the microprocessor output. The microprocessor output is proportional to desired motor speed for an elevator door drive motor according to a velocity profile stored in a ROM. Thereby, the High:Low ratio of the comparator output is a pulse width modulation signal, which is amplified for the motor, at a much higher frequency than the microprocessor duty cycle.

Other objects, features and advantages of the invention will become apparent in light of the following description thereof.

BEST MODE FOR CARRYING OUT THE INVENTION

Figure 1:
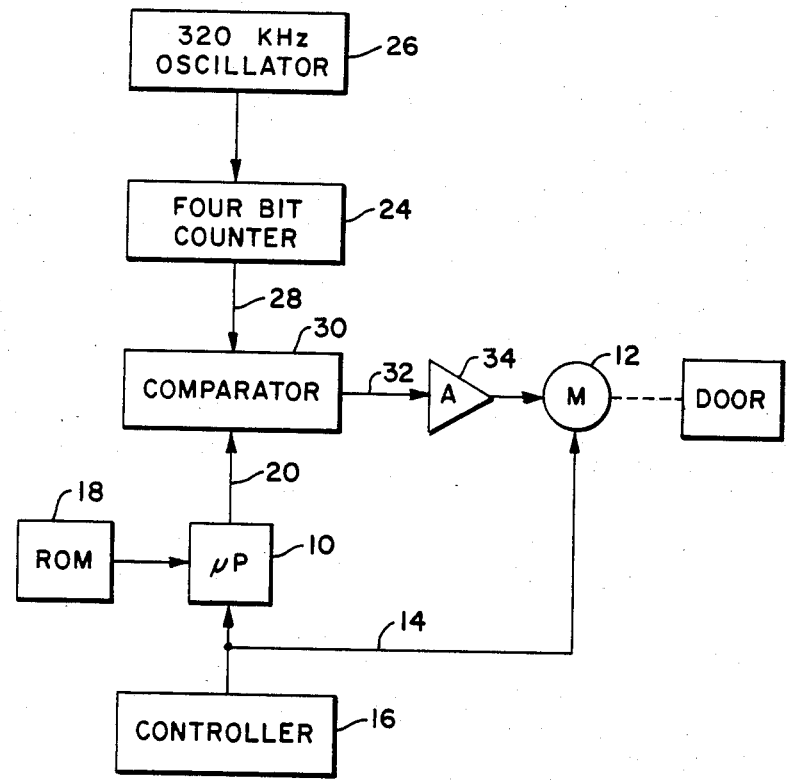
FIG. 1 is a block diagram of the pulse width modulation circuit of this invention.

FIG. 1 shows the operative heart of the invention. A microprocessor 10, such as an Intel 8031 controls the door motor 12 of an elevator in response to a "door open" or "door close" state signal on a line 14 from the system controller/dispatcher 16. The processor 10 itself regulates the speed of door opening and closing according to a velocity profile which is contained in a lookup table, such as in a programmable Read Only Memory (ROM) 18.

The processor 10 outputs a four bit signal indicative of desired motor speed on parallel lines 20. The state signal indicative of door direction is provided to the motor on the line 14. Since the duty cycle of the processor is 100 Hz, a fresh desired motor speed signal is provided every 10 milliseconds, for the full duty cycle.

A four bit binary counter 24 is clocked by a 320 KHZ oscillator 26. Therefore, for each 10 ms processor duty cycle, the counter counts 200 times from 0 to 15 as indicated by signals on parallel lines 28.

A digital comparator 30 is connected to the counter 24 and the microprocessor 10. The output of the comparator 30 on a line 32 is High so long as the microprocessor output exceeds the counter output, and becomes Low when the counter output is at least the processor output.

Figure 2:
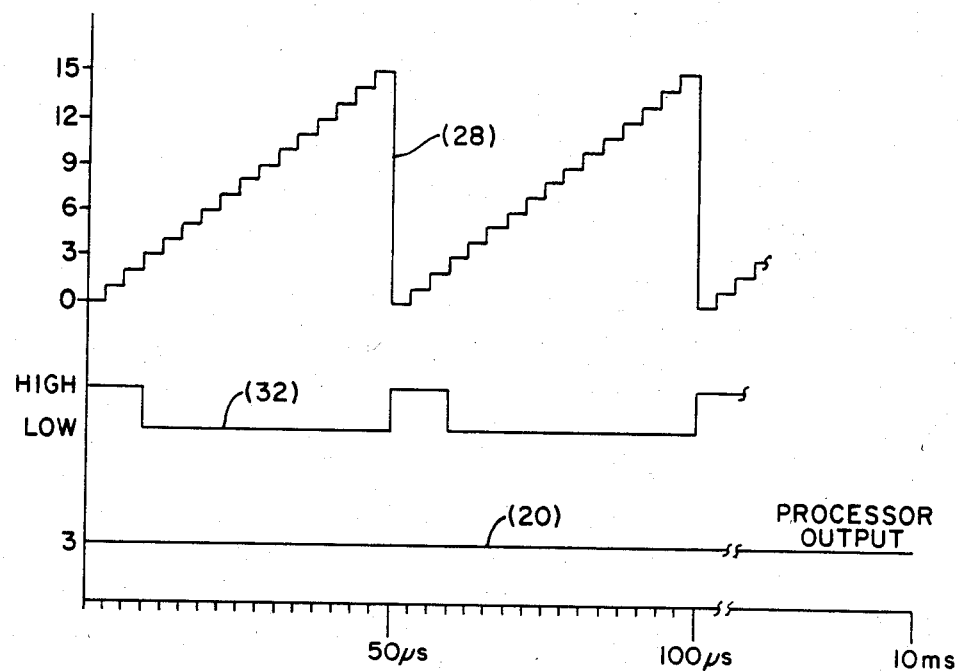
FIG. 2 is a waveform diagram for the circuit of FIG. 1.

As illustrated in the timing diagram of FIG. 2, consider the case of a processor output (20) of "3", indicative of 20 percent motor speed. For the full 10 ms duty cycle, the processor output (20) is "3". Meanwhile the counter output (28) is incrementing from 0 to 15 every 50 microseconds. So long as the counter output is "0", "1", or "2", the comparator output (32) is High. For "3" to "15" the comparator is Low. This results in a 20 KHz pulse width modulation signal for the motor, which is above the audible range for humans. The High:Low ratio of the comparator output is proportional to the desired velocity.

The logic level output of the comparator is provided to a suitable motor drive amplifier 34, such as power MOSFETs, which drive the DC motor 12 according to the dictated velocity.

What is claimed is:

1. A high frequency pulse width modulation circuit for controlling a door drive motor atop an elevator car in response to a low frequency microprocessor, comprising:

a controller (16) for providing a state signal indicative of "door open" or "door close";

ROM means (18) for storing a velocity signal indicative of the desired velocity profile of the door drive motor;

a microprocessor (10) having a slow duty cycle, responsive to the state signal for providing the velocity signal from the ROM to a first line (20);

high frequency oscillator means (26) for providing a high frequency signal;

counter means (24) for providing an incrementing count signal on a second line (28) several times during the duty cycle of the microprocessor in response to the high frequency signal;

comparator means (30), connected at its inputs to the first line (20) and to the second line (28), for providing an output signal on a third line (32) which is High when the velocity signal is greater than the incrementing count signal and which is Low when the incrementing count signal is greater than or equal to the velocity signal, so that the High:Low ratio of the output signal is proportional to the velocity signal from the microprocessor;

amplification means (34), connected at its input to the third line (32) for providing an output at power levels for operating the door drive motor (12) in response to the comparator means output, wherein the door drive motor speed is proportional to the High:Low ratio of the output signal.

* * * * *

UNITED STATES PATENT AND TRADEMARK OFFICE
CERTIFICATE OF CORRECTION

PATENT NO. : 4,567,411

DATED : January 28, 1986

INVENTOR(S) : Kurt Reimann et al

It is certified that error appears in the above-identified patent and that said Letters Patent is hereby corrected as shown below:

Title page, Column 2 "Attorney, Agent, or Firm - Gerald E. Linde"

should read --Attorney, Agent, or Firm -

Gerald E. Linden--

Signed and Sealed this

Tenth Day of January, 1989

*Attest:*

DONALD J. QUIGG

*Attesting Officer*     *Commissioner of Patents and Trademarks*